US012777242B2

(12) United States Patent
Katz et al.

(10) Patent No.: US 12,777,242 B2
(45) Date of Patent: Oct. 27, 2026

(54) OBJECT TRACKER USING GAZE ESTIMATION

(71) Applicant: Corephotonics Ltd., Tel Aviv (IL)

(72) Inventors: Ruthy Katz, Tel Aviv (IL); Harel Gazit, Tel Aviv (IL); Adi Falik, Tel Aviv (IL); Adi Teitel, Tel Aviv (IL); Gal Shabtay, Tel Aviv (IL)

(73) Assignee: Corephotonics Ltd., Tel Aviv (IL)

(*) Notice: Subject to any disclaimer, the term of this patent is extended or adjusted under 35 U.S.C. 154(b) by 0 days.

(21) Appl. No.: 19/100,567

(22) PCT Filed: Jul. 3, 2023

(86) PCT No.: PCT/IB2023/056903
§ 371 (c)(1),
(2) Date: Feb. 2, 2025

(87) PCT Pub. No.: WO2024/028672
PCT Pub. Date: Feb. 8, 2024

(65) Prior Publication Data

US 2026/0046507 A1 Feb. 12, 2026

Related U.S. Application Data

(60) Provisional application No. 63/394,441, filed on Aug. 2, 2022.

(51) Int. Cl.
*H04N 23/61* (2023.01)
*G06F 3/01* (2006.01)
(Continued)

(52) U.S. Cl.
CPC ............. *H04N 23/61* (2023.01); *G06F 3/013* (2013.01); *H04N 23/45* (2023.01);
(Continued)

(58) Field of Classification Search
CPC ...... H04N 23/45; H04N 23/61; H04N 23/611; H04N 23/65; H04N 23/651; H04N 23/675; H04N 23/69; H04N 23/695; G06F 3/013
See application file for complete search history.

(56) References Cited

U.S. PATENT DOCUMENTS 10,666,856 B1 5/2020 Rueckner
2014/0244505 A1 8/2014 Kim
(Continued)

FOREIGN PATENT DOCUMENTS

KR 102200639 B1 1/2021
KR 20220079426 A 6/2022

OTHER PUBLICATIONS

Office Action in related EP Application 23 809 293.6 dated Jul. 27, 2026.
(Continued)

*Primary Examiner* — Daniel M Pasiewicz
(74) *Attorney, Agent, or Firm* — Menachem Nathan; Nathan & Associates

(57) ABSTRACT

Mobile devices such as smartphones, comprising a first camera having a first field of view FOV1 pointed towards a scene to be photographed, the first camera configured to capture first image data, a second camera having a second field of view FOV2 pointed towards a scene that includes eyes of a user, the second camera configured to capture second image data, and a processor including an object tracker and an eye tracker configured to use the first image data to perform object tracking and to use the second image data to perform gaze estimation, wherein the object tracker is configured to use gaze estimation to perform an action selected from the group consisting of selection of an object in the scene that is to be tracked by the object tracker,
(Continued)

verification of a tracked object in the scene and re-identification of a tracked object in the scene.

20 Claims, 6 Drawing Sheets

(51) Int. Cl.
*H04N 23/45* (2023.01)
*H04N 23/65* (2023.01)
*H04N 23/67* (2023.01)
*H04N 23/69* (2023.01)

(52) U.S. Cl.
CPC ......... *H04N 23/651* (2023.01); *H04N 23/675* (2023.01); *H04N 23/69* (2023.01)

(56) References Cited

U.S. PATENT DOCUMENTS

| | | | | |
|---|---|---|---|---|
| 2015/0105123 | A1* | 4/2015 | Song | H04N 23/45 455/556.1 |
| 2016/0261793 | A1* | 9/2016 | Sivan | H04N 19/597 |
| 2020/0128232 | A1 | 4/2020 | Hwang et al. | |
| 2023/0011551 | A1* | 1/2023 | Usami | H04N 23/45 |
| 2023/0276116 | A1* | 8/2023 | Agrawal | H04N 5/607 |

OTHER PUBLICATIONS

Office Action in related KR Application 10-2025-7004379 dated Aug. 14, 2026.

* cited by examiner

OBJECT TRACKER USING GAZE ESTIMATION

CROSS REFERENCE TO RELATED APPLICATIONS

This is a 371 application from international patent application PCT/IB2023/056903 filed Jul. 3, 2023, which is related to and claims priority from U.S. provisional patent application No. 63/394,441 filed Aug. 2, 2022, which is incorporated herein by reference in its entirety.

FIELD

The subject matter disclosed herein relates in general to camera algorithms for use in mobile devices, and in particular camera algorithms for use in smartphones.

BACKGROUND

Modern mobile electronic devices (or just "mobile devices") such as smartphones, tablets, laptops, smartwatches, or headsets (also referred to as "glasses") for advanced reality (AR) or virtual reality (VR), include a variety of camera-related technologies. In terms of hardware, they in general include a screen (or display) and multiple cameras with different fields of view (FOVs) that may be located at different surfaces of the mobile device. In general, a mobile device comprises at least one front camera (also referred to as "user-facing camera" or "selfie-camera") that is located at a first (or "front") surface of the mobile device which includes the screen, and at least one rear camera (or "world-facing camera") that is located at a second (or "rear") surface of the mobile device, the second surface pointing to a direction opposite to that of the first surface (see FIG. 6). Thus, a mobile device can capture different scene segments simultaneously. For example, the mobile device can capture a scene with its rear camera and simultaneously capture a user that controls the mobile device with its front camera, e.g. by touching a touchscreen. In terms of software, mobile devices include advanced image processing methods that process image data that is generated (or captured) by the multiple cameras. Examples for such image processing methods include methods used for object detection, saliency detection and object tracking.

These image processing methods allow a user of a mobile device to capture photos or videos of a scene according to his/her intention. "Intention" with reference to a user (i.e. "user intention") refers here to a camera control scenario intended by the user (e.g. an intended focusing scenario), or to a mobile device control scenario intended by the user (e.g. an intended image processing scenario). As an example for an intended focusing scenario, the user may intend to focus a camera on a particular object in the scene. As an example for an intended image processing scenario, the user may intend to achieve a particular brightness and/or contrast for a particular object in the scene.

FIG. 1 shows steps of a known method for object tracking numbered 100.

In step 102, a user points a mobile device towards a scene (or "targets a scene") with one or more cameras included in the mobile device.

In step 104, the one or more cameras capture image data. In general, the capturing of the image data is continuous, i.e. a stream of images (or video stream) is captured. In some examples, additional data may be captured by the mobile device. The additional data may be image data, or it may not be image data. For example, additional data may be audio data, directional audio data, data on a position or orientation of the mobile devices, or data on other mobile devices that are positioned in proximity of the mobile device.

In step 106, a processor included in the mobile device runs an algorithm (or program) for analyzing the scene. For scene analysis, in general the image data captured in step 104 is analyzed. Examples for scene analysis are detecting objects in the scene and calculating a saliency map of the scene. In a saliency map, a saliency score is assigned to each segment in the scene. In some examples, the processor may generate or may use additional image-based data. The additional image-based data may include information on the type of object (e.g. whether it is a face or not, whether it is a human or an animal, etc.), on the position of a detected object in the scene, etc. Step 106 may be optional. In some examples for scene analysis, additional non-image-based data and additional image-based data is analyzed. Examples for results from such scene analysis are location and type of detected objects, location of scene segments with particular high (or low) saliency score etc. In some examples, the processor may generate a list including results from the scene analysis, referred to as "scene analysis list" in the following.

In step 108, an object to be tracked ("target object") is selected.

In examples for autonomous target object selection, the scene analysis list is used by the processor to select a particular object or scene segment from the scene analysis list for tracking. "Autonomous target object selection" means here that target object selection is performed by the mobile device without any user intervention.

In examples for user target object selection, a particular object or scene segment may be selected according to a user command. "User target object selection" means here that target object selection is performed based on a user intention. E.g., the additional non-image-based data may include user commands to the mobile device which indicate a user intention. As an example for a user command, a user may indicate his/her user intention to select an object in the scene by touching a location on a touchscreen that displays the object. Another example for a user command is a user transmitting a voice command. It is noted that for indicating the intention of the user by a user command, a physical interaction between the user and the mobile device is necessary (e.g. touching the mobile device, or speaking to the mobile device).

The data used and generated in step 108 is referred to in the following as "initialization information", as it is used to "initialize" (or "define" or "set up") an object tracker module (or simply "object tracker") within the processor In step 112, the object tracker within the processor tracks the object selected in step 108 in a continuous manner, i.e. in each (or in each second, or in each third, or even in each eighth or tenth etc.) image of the captured image stream, and the position of the tracked object within the scene is calculated. In general, a verification step is performed simultaneously. In some examples, a "confidence score" is calculated for verification. The confidence score indicates a probability that the calculated position of the tracked object is correct, i.e. it verifies the validity of the results of the object tracker. The higher the confidence score, the higher the probability that the calculated position of the tracked object is correct. Thus, the confidence score is a measure for a "reliability" of the object tracker. "Reliability" refers here to the capability of an object tracker to track a target object correctly, i.e. to correctly calculate a position of a particular target object. The position of the tracked object may be used for controlling one or more cameras included in the mobile device (e.g. for focusing a camera) or for further image processing (e.g. for optimizing brightness in a captured image). In some scenarios, e.g. from a particular image of the captured image stream on, the processor is unable to track the object, i.e. the processor does not succeed in calculating a position of the tracked object within the scene, resulting in an undesired phenomenon that is referred to herein as "target loss".

In case of target loss, in step 114 the processor uses initialization information to re-detect and identify the target object and its position in the scene, a process called "re-identification". In general, re-identification includes an additional sub-step for object detection. In case the re-identification succeeds, it is returned to step 112 and the processor continues to track the target object. In case the re-identification fails, it is returned to step 106 or to step 108, which is undesirable. The frequency of occurrence of re-identification fails is correlated to the quality of an object tracker. An object tracker with only a low frequency of occurrence of re-identification fails is preferred and referred to as a "robust" object tracker, and the quality of the object tracker as "robustness". It is noted that in step 114, in general only initialization information but no real-time information on the intention of the user is available.

It would be beneficial to use additional information on the intention of a user for (1) automatically selecting a target object without the need for a physical interaction between the user and a mobile device, and/or (2) for increasing the reliability of an object tracker, and/or (3) for increasing the robustness of an object tracker. These features are lacking in known art.

SUMMARY

In various examples, there are provided mobile devices, comprising: a first camera configured to capture first image data and having a first field of view (FOV1) pointed towards a first scene; a second camera configured to capture second image data and having a second field of view (FOV2) pointed towards a second scene that includes eyes of a user; and a processor that includes an object tracker and an eye tracker, wherein the object tracker is configured to use the first image data to perform object tracking and wherein the eye tracker is configured to use the second image data to perform gaze estimation.

In some examples, the object tracker is configured to use the gaze estimation to select an object in the first scene for tracking by the object tracker.

In some examples, the object tracker is configured to use the gaze estimation to verify a tracked object in the first scene.

In some examples, the object tracker is configured to use gaze estimation to re-identify a tracked object in the first scene.

In some examples, the gaze estimation is performed directly by the user gazing at a location in the scene.

In some examples, the mobile device has a front side with a front surface and a rear side with a rear surface, the front surface includes a screen, the first camera is located at the rear side and the second camera is located at the front side. In some examples, the gaze estimation is performed indirectly by the user gazing at a location on the screen.

In some examples, the object tracking provides additional scene information, and the additional scene information is used to control the second camera. In some examples, the additional scene information is used to control the mobile device.

In some examples, the control of the second camera includes a control selected from the group consisting of a control to focus the second camera, a control to personalize an object selection, a control to improve an image quality of a region-of-interest within FOV2, a control to zoom the second camera, a control to select an image resolution, and any combination thereof.

In some examples, the control of the mobile device includes a control to prioritize processing scene segments in FOV1 or FOV2.

In some examples, the second camera is an active camera.

In some examples, the mobile device is a smartphone.

In some examples, the mobile device is a tablet.

In some examples, the mobile device is a headset for AR or VR.

In some examples, the mobile device is a smartwatch.

In various examples, there are provided systems, comprising: a first mobile device comprising a first camera configured to capture first image data and having a first field of view (FOV1), the first camera pointed towards a first scene that includes eyes of a user; a second mobile device comprising a second camera configured to capture second image data and having a second field of view (FOV2), the second camera pointed towards a second scene; and one or more processors that include an object tracker and an eye tracker, wherein the eye tracker is configured to use the first image data to perform gaze estimation, and wherein the object tracker is configured to use the gaze estimation to select an object in the second scene for object tracking and to use the second image data to perform the object tracking.

In some examples, the one or more processors are included in the second mobile device. In some examples, the one or more processors include a first processor and a second processor, the first processor is included in the first mobile device, and the second processor is included in the second mobile device.

In some examples, the first mobile device is configured to transmit the first image data to the second mobile device.

In some examples, the first processor performs the gaze estimation, the first mobile device is configured to transmit the gaze estimation information to the second mobile device, and the second processor performs the object tracking.

In some examples, the gaze estimation is performed directly by the user gazing at a location in the scene.

In some examples, the first mobile device includes a screen, and the gaze estimation is performed indirectly by the user gazing at a location on the screen.

In some examples, object tracking provides additional scene information, and the additional scene information is used to control the second camera.

In some examples, the control of the second camera includes a control selected from the group consisting of a control to focus the second camera, a control to personalize an object selection, a control to improve an image quality of a region-of-interest within FOV2, a control to zoom the second camera, a control to select an image resolution, and any combination thereof.

In some examples, the first camera is an active camera.

In some examples, the first mobile device and the second mobile device are smartphones.

In some examples, the first mobile device is a headset and the second mobile device is a smartphone.

In some examples, the first mobile device is a smartwatch and the second mobile device is a smartphone.

BRIEF DESCRIPTION OF THE DRAWINGS

Non-limiting examples are described below with reference to figures attached hereto that are listed following this paragraph. Identical structures, elements or parts that appear in more than one figure are generally labelled with a same numeral in all the figures in which they appear. The drawings and descriptions are meant to illuminate and clarify examples of the subject matter disclosed herein, and should not be considered limiting in any way. In the drawings.

DETAILED DESCRIPTION

Figure 2:
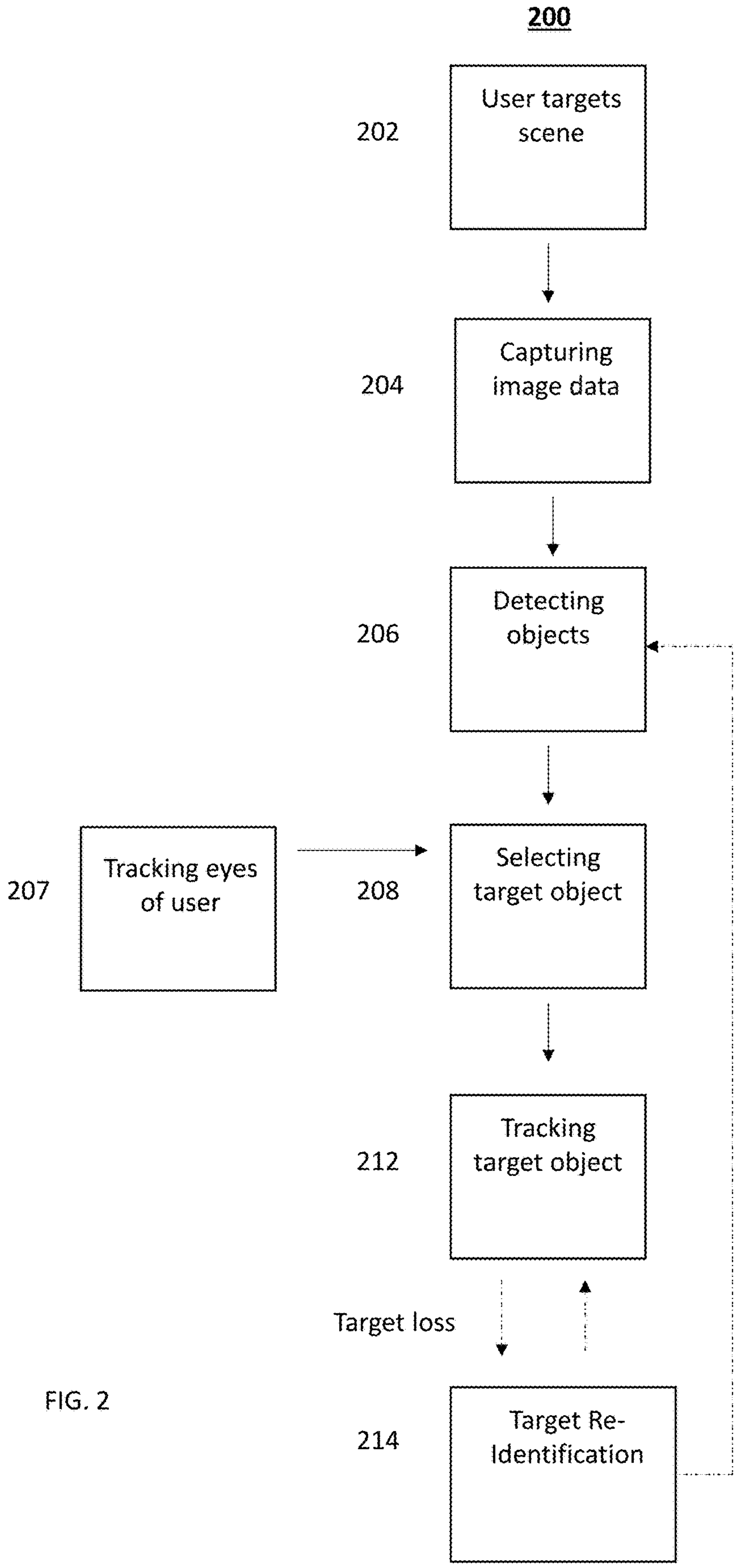
FIG. 2 shows an exemplary method for automated tracking target object selection using gaze estimation disclosed herein.

FIG. 2 shows steps of an exemplary method for object selection and tracking disclosed herein and numbered 200. Method 200 allows for automatically selecting a target object without the need for a physical interaction between a user and a mobile device.

Figure 1:
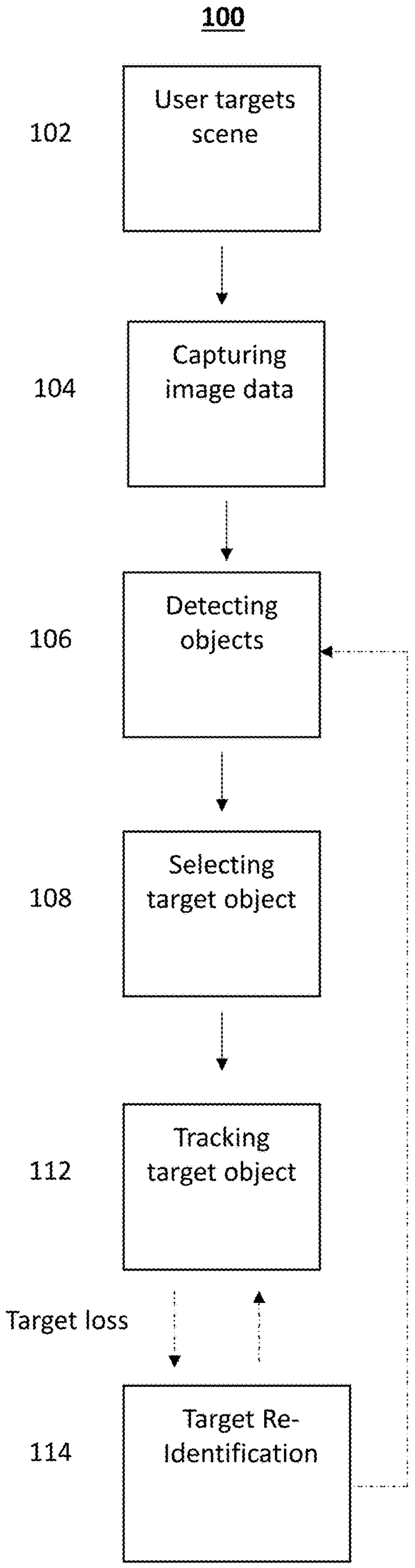
FIG. 1 shows an example of a known method for object tracking.

Method 200 includes all steps included in method 100 and, in addition, method 200 includes a seventh step 207. The numbers 202, 204, 206, 208, 212, 214 represent the same steps as 102, 104, 106, 108, 112, 114 of FIG. 1. The same holds for the numbers 302, 304, 306, 308, 312, 314 in FIGS. 3 and 402, 404, 406, 408, 412, 414 in FIG. 4 respectively. In step 207, the eyes of a user are tracked to estimate a location where the user is gazing at in a scene, i.e. to perform "gaze estimation". For gaze estimation, image data is analyzed. For example, a first camera captures a first image data of a first scene, the first scene including a target object, and wherein the first image data is used for object tracking. A second camera captures a second image data of a second scene, the second scene including the eyes of the user, and wherein the second image data is used to perform gaze estimation. A first camera may be a rear camera such as rear camera 520 used for photographing or capturing a video of the first scene, and a second camera may be a front camera such as front camera 510. In general, the first scene may be different from the second scene. Here and in the following, it is assumed that the gaze estimation is performed continuously and in real-time, e.g. by analyzing a video image stream. The gaze estimation may represent additional data that includes (or can be interpreted as) user commands to the mobile device, which indicate a user intention. That is, by using gaze estimation, a user command can be transmitted to the mobile device. It is noted that when using gaze estimation to transmit a user command, no physical interaction between the user and the mobile device is necessary (e.g. no touching the, or speaking to the mobile device is required). This is beneficial for fast, convenient and natural interaction between a user and the mobile device.

For example, the user intention is to select a target object to be tracked. When the user gazes at a particular location within a scene, this particular location information may be interpreted as a user intention to select a particular object located in this very scene segment and to track it. In short, the particular object is selected because it is in, or close to, the particular location.

In these examples, the gaze estimation of step 207 and the derived user command are used as initialization data in step 208.

As a first example of using gaze estimation to transmit a user command ("focus tracking example"), a user may want to continuously focus the camera onto this particular selected object, for capturing a video image stream or single consecutive still images so that this particular selected object is always in-focus.

As a second example of using gaze estimation to transmit a user command ("focus location example"), a user may want to continuously focus the camera onto this particular FOV segment, for capturing a video image stream or single consecutive still images so that this particular selected FOV segment is always in-focus.

As a third example of using gaze estimation to transmit a user command ("region of interest (ROI) optimization example"), a user may want to optimize a quality of an image segment the particular location the user gazes at. This image segment is referred to hereinafter as ROI. This means that a user may be ready to accept a lower quality in image segments other than the ROI, if the quality of the ROI is improved. A first example of ROI optimization refers to a pre-capture scenario, where a sensor exposure may be controlled so that a beneficial output is achieved for the ROI. A beneficial output may be that a large signal-to-noise ratio (SNR) or a large dynamic range is achieved in the ROI. A second example of ROI optimization refers to a post-capture scenario, where an auto-white balance or a tone mapping may be controlled so that a beneficial output is achieved for the ROI.

As a fourth example of using gaze estimation to transmit a user command ("zooming example"), a user may want to capture a ROI with a higher resolution than used for capturing image segments other than the ROI. For an image sensor having adaptive pixel resolution, a resulting action may be that in the ROI the spatial (or pixel) resolution of the image sensor is switched to a higher resolution, compared to a resolution of other image segments. For a multi-camera, a resulting action may be that the multi-camera switches to a different camera (e.g. a Telephoto camera) than currently used so that the ROI can be captured with higher resolution.

The gaze estimation is used to select a target object, i.e. to initialize an object tracker such as (see FIG. 5) object tracker 538 which, upon initialization, tracks the particular object and continuously transmits location information to an application processor (AP) such as AP 530. A camera control such as 540 included in AP 530 calculates autofocus information and transmits it e.g. to rear camera 520 for focusing rear camera 520 so that the particular object is in-focus.

Figure 3:
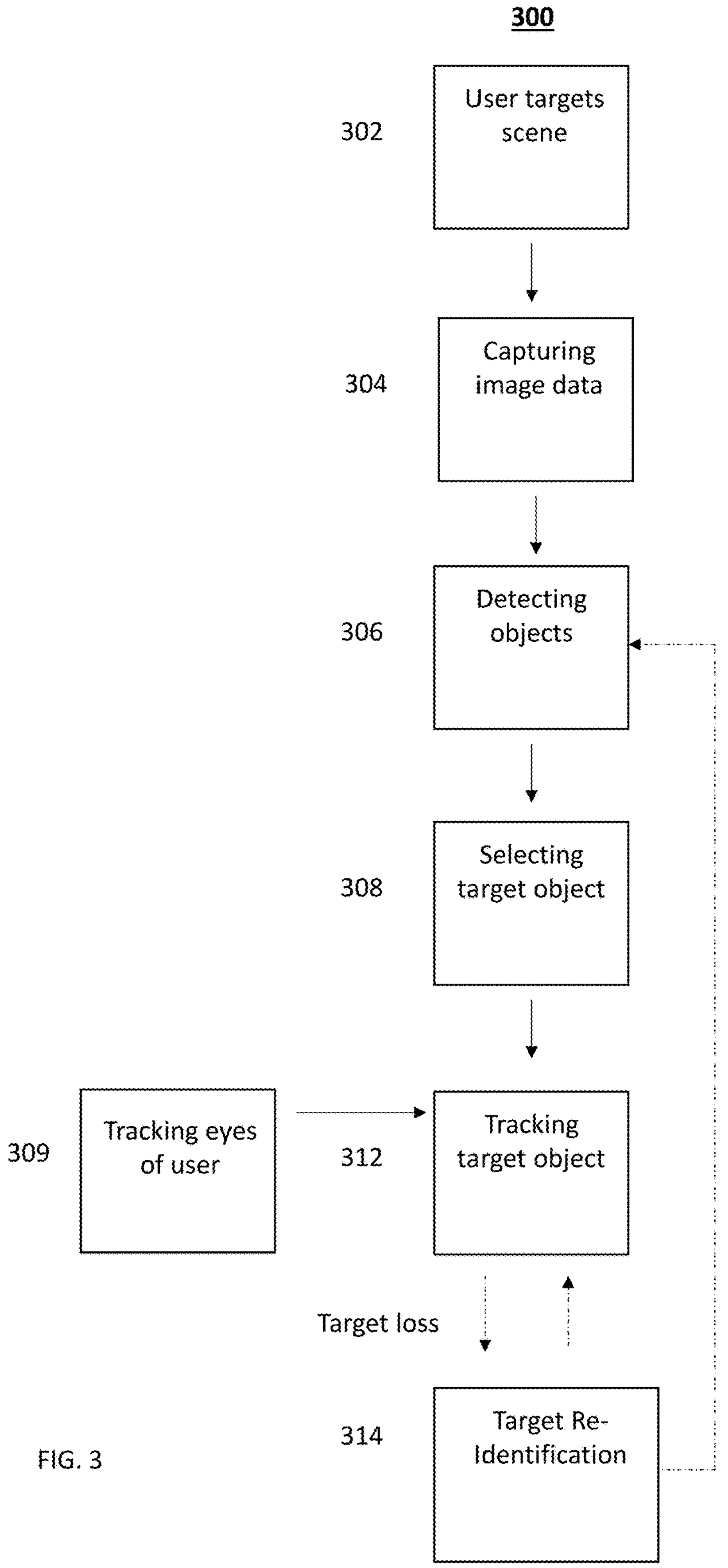
FIG. 3 shows an exemplary method for reliable object tracking using gaze estimation disclosed herein.

FIG. 3 shows steps of an exemplary method for reliable object tracking disclosed herein numbered 300. Method 300 allows for increasing the reliability of an object tracker.

Method 300 includes all steps included in method 100 and, in addition, method 300 includes a step 309. In step 309, the mobile device performs gaze estimation. Here, the gaze estimation is used to continuously transmit a user command. That is, in contrast with method 200, the gaze estimation of step 309 and the derived user command is not used as initialization data, but for continuously monitoring whether a user intention is satisfied. In a first scenario, when a user gazes at a particular location within a scene that includes a tracked target object, this location information may be interpreted as indication that the object tracker indeed is tracking the target object. As a result of this, for example a higher confidence score may be assigned. A "higher confidence score" means here that the confidence score assigned using gaze estimation is higher than a confidence score assigned in a scenario where no gaze estimation information is available, or in a scenario where the user gazes at a location within the scene that does not include the tracked target object.

In a second scenario, when a user gazes at a particular location within a scene that does not include a target object, this location information may be interpreted as indication that the object tracker is not tracking the target object and a lower confidence score may be assigned. In other words, the gaze estimation is used to verify a result of an object tracker. By gaze estimation, in addition to the initialization information, real-time information is available. The real-time information is interpreted as a user intention, which increases the reliability of the object tracker.

Figure 4:
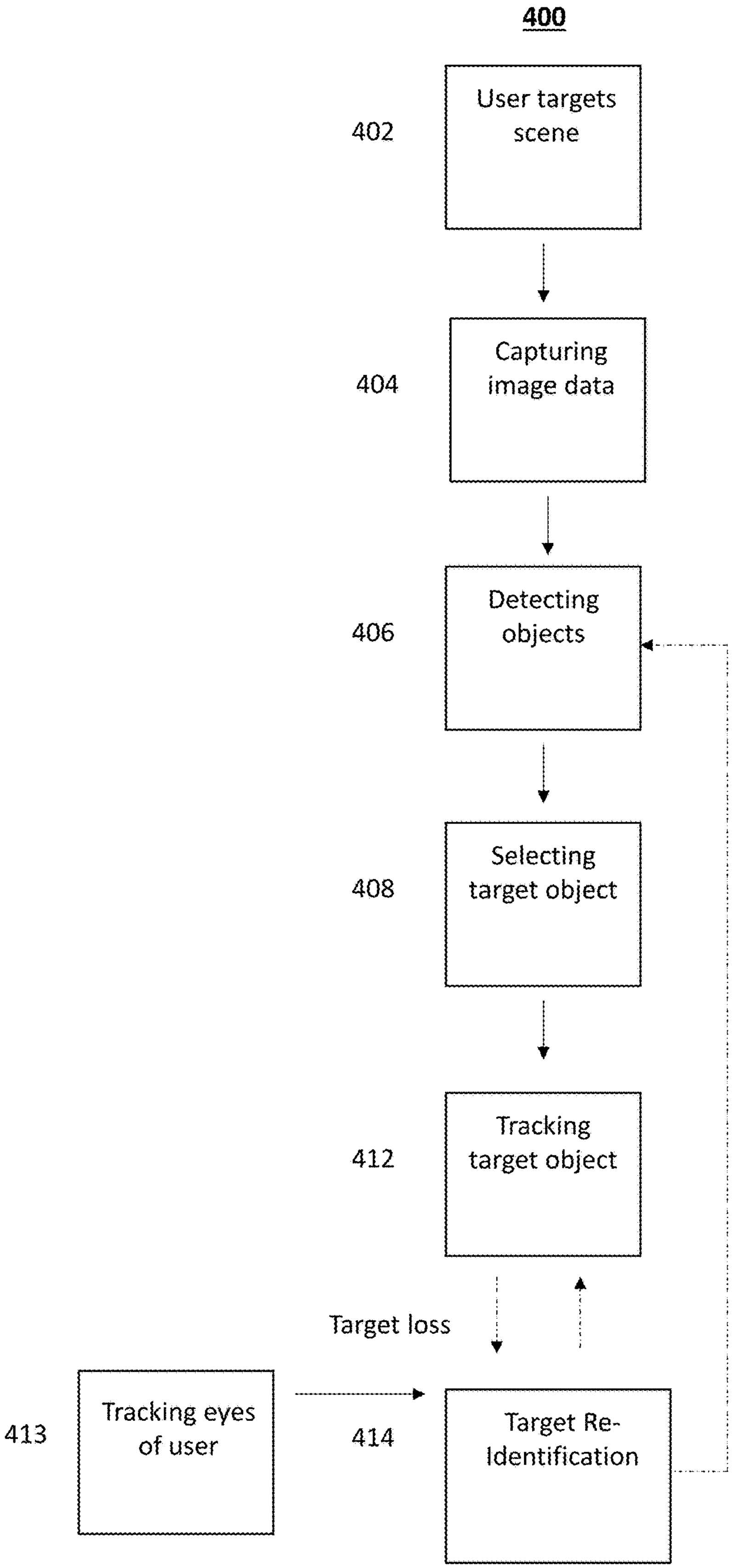
FIG. 4 shows another exemplary method for robust object tracking using gaze estimation disclosed herein.

FIG. 4 shows steps of an exemplary method of robust object tracking disclosed herein and numbered 400. Method 400 allows for increasing the robustness of an object tracker. Note that steps of methods 200, 300 and 400 may be mixed to obtain methods for increasing any combination of two or all of automatic selection of an object to be tracked, increased reliability and/or increased robustness of object tracking.

Method 400 includes all steps included in method 100 and, in addition, method 400 includes a seventh step 413. In step 413, the mobile device performs gaze estimation. The gaze estimation of step 413 may not be used to derive a user command, but it may for example be used to prioritize a scene segment or an object in the scene.

For example and after target loss, when a user gazes at a particular location within the scene, this location information may be interpreted as an indication that the particular location includes the (lost) target object. This can significantly facilitate re-identification of a target object after target loss. The following examples refer to an additional object detection sub-step included in the re-identification step. For example, a processor may prioritize particular scene segments based on the location information, which is beneficial in terms for fast computation time and low computation power consumption. In some examples and instead of performing object detection at an entire FOV, a processor may perform object detection only at a scene segment smaller than the FOV which includes the particular location. Thus the object detection is accelerated and/or consumes less power compared to a scenario where no gaze estimation is available. In other examples, a processor may perform object detection first at a first scene segment smaller than the FOV, the first scene segment including the particular location, and only later it may perform object detection at further scene segments of the FOV. In yet other examples and for prioritizing a scene segment including the particular location, a processor may intentionally decrease the image resolution of an image used for object detection such that the resolution of a scene segment decreases with an increasing distance from the particular location. That is, a first scene segment in vicinity of the particular location may have a higher image resolution than a second scene segment which is farther away from the particular location.

Overall, the gaze estimation is used to increase the robustness of the object tracker. By gaze estimation, in addition to the initialization information, real-time information is available. The real-time information is interpreted as a user intention, what increases the robustness of the object tracker.

The gaze estimation may be performed by using image data from a suitable camera included in the mobile device which is not used for the object tracking task. "Suitable camera" refers here to the fact that the camera must cover a scene segment that includes the eyes of the user. As an example, image data from a rear camera (or "world-facing camera") such as rear camera 520 may be used for object tracking, and image data from a front camera (or "user-facing camera" or "selfie-camera") such as front camera 510 may be used for gaze estimation. Gaze estimation may be performed according to two different approaches.

A first approach refers to a scenario where a mobile device's screen (or display) displays in real-time a scene segment as captured by a camera included in the mobile device. In the first approach, it is required that a user gazes at the mobile device screen. A particular location the user gazes at within a scene is estimated indirectly by estimating a location the user gazes at on the screen. That is, during indirect gaze estimation, the user gazes at the screen.

A second approach refers to a scenario where a user gazes at the scene itself. In the second approach, a particular location within a scene at which the user gazes is estimated directly. "Direct gaze estimation" thus refers to the user gazing at the scene (as opposed to the user gazing at a screen showing the particular location in the scene).

Figure 5:
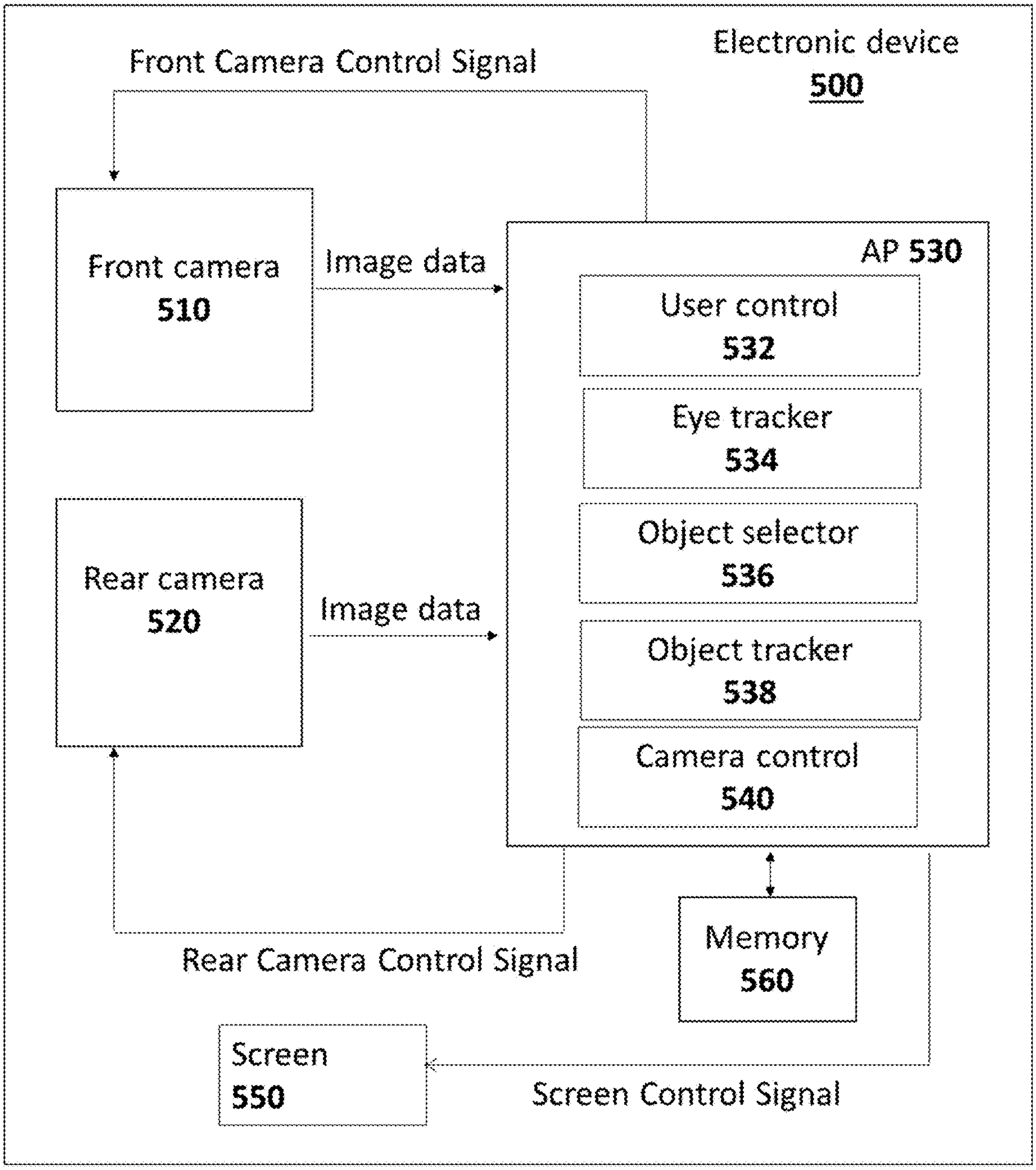
FIG. 5 shows schematically an example of a mobile device for object tracking disclosed herein.

FIG. 5 shows schematically an embodiment of a mobile device (for example, a smartphone) numbered 500 configured to perform methods disclosed herein. Mobile device 500 comprises a front camera 510 and a rear camera 520. Each camera has a FOV. The mobile device may include more than two cameras, each with a respective FOV, as known. Mobile device 500 is operational to simultaneously capture front image data with front camera 510 and rear image data with rear camera 520.

Mobile device 500 further includes an application processor (AP) 530. AP 530 includes a user control 532, e.g. configured to receive an input of a user that is transmitted via a touchscreen such as screen 550, an eye tracker module (or simply "eye tracker") 534, e.g. configured to receive image data which is used to continuously estimate the gaze of a user, an object selector module (or simply "object selector") 536, e.g. configured to receive information from user control 532 and eye tracker 534 and to run object detection algorithms and to select a target object, an object tracker module (or simply "object tracker") 538 configured to continuously track the target object, and a camera control module 540, configured to calculate camera control signals such as autofocus control signals for front camera 510 and rear camera 520. To clarify, modules such as 534, 536, 538 and 540 may be implemented in software (SW) or in a combination of SW and hardware (HW). In some examples, front camera 510 and/or rear camera 520 may be a multi-aperture camera (or simply multi-camera). In some examples, front camera 510 may include means to illuminate a scene captured by front camera 510. Such means to illuminate may be for example a light emitting diode ("LED"), a vertical-cavity surface-emitting laser ("VCSEL"), an edge emitting laser ("EEL") etc. In general, means to illuminate a scene may be located in proximity to an image sensor included in front camera. A camera that includes means to illuminate is referred to herein as "active camera".

Mobile device 500 further includes a screen 550 for displaying information. Screen 550 may be a touchscreen, configured to receive user commands. Mobile device 500 further includes a memory 560, e.g. for storing calibration data between front camera 510 and rear camera 520. In other examples, memory 560 may include a personal "image gallery" including various images a particular user of mobile device 500 captured and/or stored in the past. In other examples, a personal image gallery of a particular user may not be stored on mobile device 500, but may be stored e.g. a cloud server which is accessible from mobile device 500. Images included in a personal image gallery may be used (in addition to eye tracking information) to extract additional information on the intention of the user, e.g. by performing a statistical analysis of images included in the personal image gallery. For example, a particular object such as a particular person that was captured relatively often in the past (and therefore appears relatively often in the personal image gallery) may be preferred over objects which do not yet (or not as often as the particular object) appear in the personal image gallery. In a situation where a user gazes at a particular location within a scene (or FOV) which includes the particular object and one or more further objects, the particular object may be selected (e.g. as target object in step 208) based on statistics of the personal image gallery. This selection process is referred to as "personalized object selection". Mobile device 500 may further include several additional sensors that capture additional non-image-based data which is used by object selector 536 and/or object tracker 538, e.g. a microphone or even a directional microphone, a location sensor such as GPS, or an inertial measurement unit (IMU).

In some examples, gaze estimation may, partly or completely, not be performed by mobile device 500, but by an additional mobile device (e.g. another smartphone, a headset for AR or VR, a smartwatch, a tablet, a laptop, etc.). The additional device may capture image data including the eyes of a user and may perform gaze estimation using a processor included in the additional device. Then, the additional device may transmit the gaze estimation data to mobile device 500. Mobile device 500 uses the gaze estimation data from the additional mobile device to perform methods disclosed herein. In other examples, image data used for gaze estimation may not be captured by mobile device 500, but by an additional mobile device. The image data may include the eyes of a user and may be transmitted to mobile device 500. Mobile device 500 may use the image data captured by the additional mobile device to perform gaze estimation in methods disclosed herein.

Figure 6:
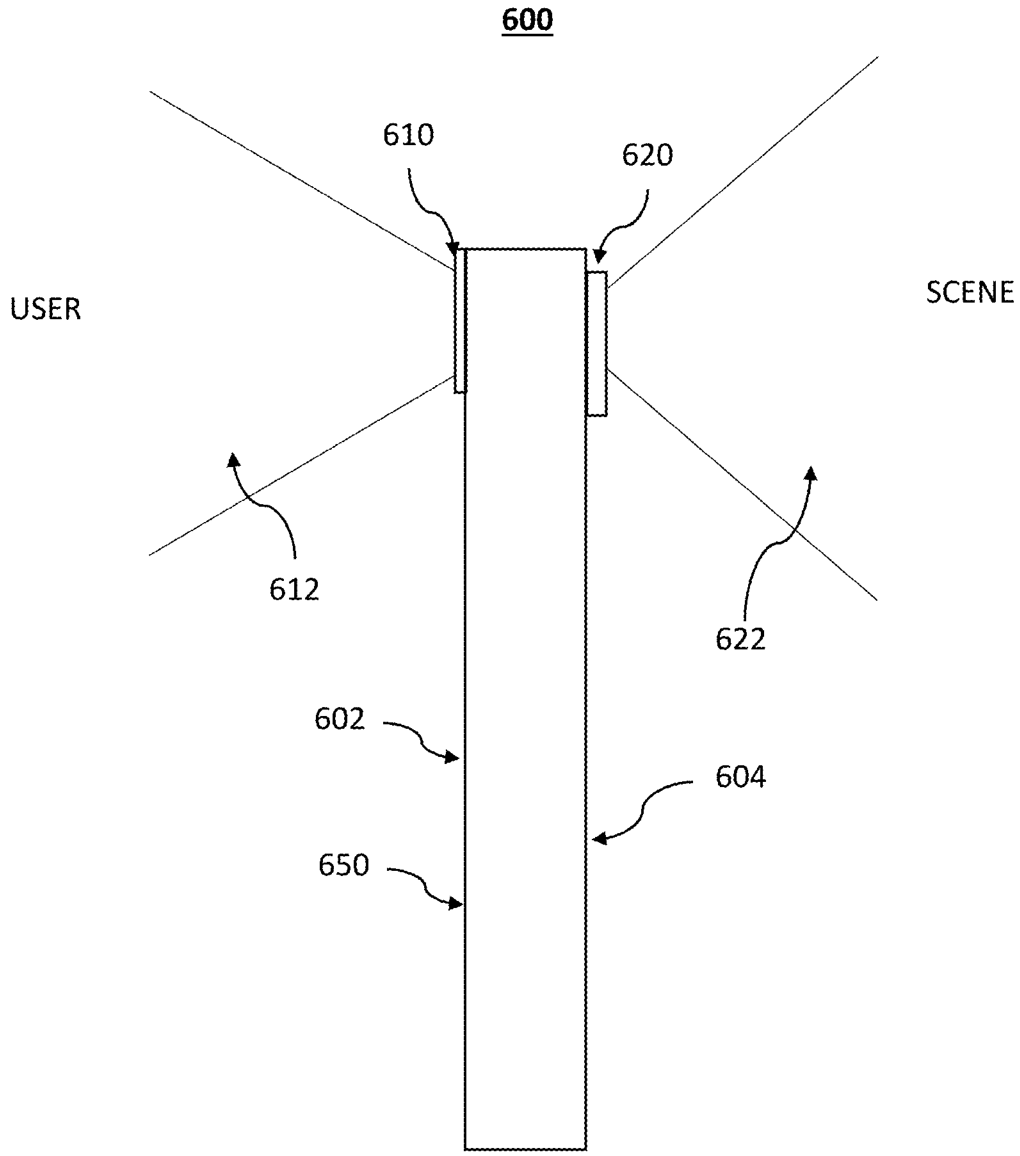
FIG. 6 shows an example of a mobile device for object tracking disclosed herein.

FIG. 6 shows schematically a mobile device numbered 600 configured to perform methods disclosed herein. Mobile device 600 has a front surface 602 which is in general pointed towards a user, and a rear surface 604 which is in general pointed towards a scene that a user captures. Front surface 602 includes a front (or "user-facing") camera 610 (like camera 510) with a front camera FOV 612, or more generally, with a first FOV ("$FOV_1$"). Front surface 602 further includes screen 650. Rear surface 604 includes a rear camera 620 (like camera 520) with a rear camera FOV 622, or more generally, with a second FOV ("$FOV_2$"). Front camera 610 and rear camera 620 are configured to capture, respectively, front and rear image data that may include eyes of a user. The front and rear image data can be used for estimating a gaze of the user.

Unless otherwise stated, the use of the expression "and/or" between the last two members of a list of options for selection indicates that a selection of one or more of the listed options is appropriate and may be made.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A mobile device comprising:

a first camera, configured to capture first image data of a first scene, wherein the first scene includes a target object, and wherein the first image data is used for object tracking;

a second camera, configured to capture second image data of a second scene, wherein the second scene includes eyes of a user, and wherein the second image data is used to perform continuous, real-time gaze estimation; and a processor, comprising:

an object tracker, configured to track the target object in the first scene using the first image data, and an eye tracker, configured to estimate gaze direction of the user based on the second image data, wherein the processor is further configured to use gaze estimation data from the second camera to prioritize the target object in the first scene for fast computation time and low computation power consumption, integrate the object tracking with the gaze estimation data by comparing the gaze estimation with the target object in the first scene, and identify the target object after target loss by prioritizing scene segments containing the gaze direction of the user, and wherein the first camera and the second camera operate with distinct non-overlapping fields of view, such that the first camera captures the first scene, and the second camera captures the second scene independently.

2. The mobile device of claim 1, wherein the first camera is located on a rear surface of the mobile device, and the second camera is located on an opposing front surface of the mobile device.

3. The mobile device of claim 1, wherein the first camera captures a field of view directed at the first scene.

4. The mobile device of claim 1, wherein the second camera includes a light-emitting diode (LED) or a vertical-cavity surface-emitting laser (VCSEL), to improve gaze estimation accuracy under low-light conditions.

5. The mobile device of claim 1, wherein the gaze estimation is performed by analyzing a location within the scene at which the user gazes directly.

6. The mobile device of claim 1, wherein the gaze estimation is performed by mapping the user's gaze at a screen to a corresponding location in the scene.

7. The mobile device of claim 1, wherein the processor is further configured to refine the gaze estimation over time by using adaptive algorithms based on prior user interactions.

8. The mobile device of claim 1, wherein the processor is further configured to assign a higher confidence score to the target object when the gaze direction aligns with the target object.

9. The mobile device of claim 1, wherein the processor is further configured to prioritize specific scene segments in the first scene for object detection, based on the user's gaze.

10. The mobile device of claim 1, wherein the processor is further configured to dynamically adjust a frame rate of the first camera to improve tracking performance.

11. The mobile device of claim 1, wherein the processor is further configured to track multiple objects in the first scene by associating gaze estimation data with different scene segments.

12. The mobile device of claim 1, wherein the processor is further configured to adjust a resolution or focus of the first camera based on a region of interest identified by the gaze estimation data.

13. The mobile device of claim 1, wherein the processor is further configured to adjust a depth of field in the first scene to enhance a focus on a region of interest.

14. The mobile device of claim 1, wherein the object tracking provides additional scene information used to control the second camera for improved synchronization.

15. The mobile device of claim 1, wherein the gaze estimation data is used to transmit a user command to capture an image or start recording a video.

16. The mobile device of claim 1, wherein the gaze estimation data is transmitted to an external device for collaborative tracking or augmented reality applications.

17. The mobile device of claim 1, wherein the processor is further configured to adjust exposure settings of the first camera to optimize image quality in a region of interest.

18. The mobile device of claim 1, wherein the processor is further configured to dynamically prioritize notifications or alerts on the screen based on user focus.

19. The mobile device of claim 1, wherein the processor is further configured to determine user intent based on gaze fixation duration and associates the intent with a specific object in the first scene.

20. The mobile device of claim 1, wherein the processor is further configured to dynamically reduce image resolution in scene segments outside a region of interest to conserve processing resources.

* * * * *